(12) United States Patent
Renzo

(10) Patent No.: US 10,981,311 B2
(45) Date of Patent: Apr. 20, 2021

(54) METHOD AND ASSOCIATED TOOLING FOR THE MANUFACTURE OF A SLEEVE BY INJECTION MOULDING, AND RESULTING SLEEVE

(71) Applicant: Bernard Renzo, Laval (FR)

(72) Inventor: Bernard Renzo, Laval (FR)

(*) Notice: Subject to any disclaimer, the term of this patent is extended or adjusted under 35 U.S.C. 154(b) by 119 days.

(21) Appl. No.: 16/313,091

(22) PCT Filed: Jun. 20, 2017

(86) PCT No.: PCT/FR2017/051611
§ 371 (c)(1),
(2) Date: Dec. 24, 2018

(87) PCT Pub. No.: WO2018/002476
PCT Pub. Date: Jan. 4, 2018

(65) Prior Publication Data
US 2019/0217515 A1     Jul. 18, 2019

(30) Foreign Application Priority Data
Jun. 30, 2016 (FR) .................................... 1656184

(51) Int. Cl.
*B29C 45/43*     (2006.01)
*B29C 45/26*     (2006.01)
(Continued)

(52) U.S. Cl.
CPC .......... *B29C 45/435* (2013.01); *B29C 45/262* (2013.01); *B29C 45/44* (2013.01); *B29K 2101/12* (2013.01); *B29L 2031/703* (2013.01)

(58) Field of Classification Search
None
See application file for complete search history.

(56) References Cited

U.S. PATENT DOCUMENTS 3,578,741 A * 5/1971 Blumer .................. B29C 45/52
                                                   425/207
6,077,062 A * 6/2000 Guillemette ............ B29C 48/34
                                                   425/113

(Continued)

FOREIGN PATENT DOCUMENTS

DE          36 16 963        11/1987
DE    10 2013 218711        3/2015
(Continued)

OTHER PUBLICATIONS

International Search Report dated Feb. 7, 2017.
JP Office Action dated Jan. 29, 2021.

*Primary Examiner* — Monica A Huson
*Assistant Examiner* — Kelsey C Grace
(74) *Attorney, Agent, or Firm* — Ipsilon USA, LLP

(57) ABSTRACT

An injection-molding method for manufacturing a sleeve (1) comprising a cylindroconical body comprising at least one deformable bellows portion (2) arranged in line with a base (3), by means of tooling comprising a mold (8) formed of at least two portions (81, 82) defining a mold cavity and a core that can be inserted into the mold cavity, and comprising a first cylindroconical portion (11) provided externally with a helical thread that is complementary to a helical thread of the mold (8) and a second portion (15) that is complementary to a recessed portion of the mold (8), said method comprises a step of filling the mold spaces left free between the core and the inside of the mold cavity (9), a step of opening the mold (8) during which, or at the end of which, the second portion (15) of the core is moved axially in a direction parallel to the winding axis (XX') of the threads of the helical thread going away from the first portion (11) of the core, and a step of driving relative turning movement of the sleeve (1) and of the first part (11) of the core.

2 Claims, 4 Drawing Sheets

(51) Int. Cl.
  *B29C 45/44* (2006.01)
  *B29L 31/00* (2006.01)
  *B29K 101/12* (2006.01)

(56) References Cited

U.S. PATENT DOCUMENTS

| | | | |
|---|---|---|---|
| 2004/0026458 A1* | 2/2004 | Fuchs | B05B 11/3035 |
| | | | 222/321.6 |
| 2009/0127745 A1 | 5/2009 | Renzo et al. | |
| 2012/0088642 A1 | 4/2012 | Kulzer | |
| 2014/0145372 A1 | 5/2014 | Ueno et al. | |

FOREIGN PATENT DOCUMENTS

| | | |
|---|---|---|
| JP | 1-110117 | 4/1989 |
| JP | 1-070521 | 3/1998 |
| JP | H10 73162 | 3/1998 |
| JP | 2014-105739 | 6/2014 |
| WO | 2016/079685 | 5/2016 |

\* cited by examiner

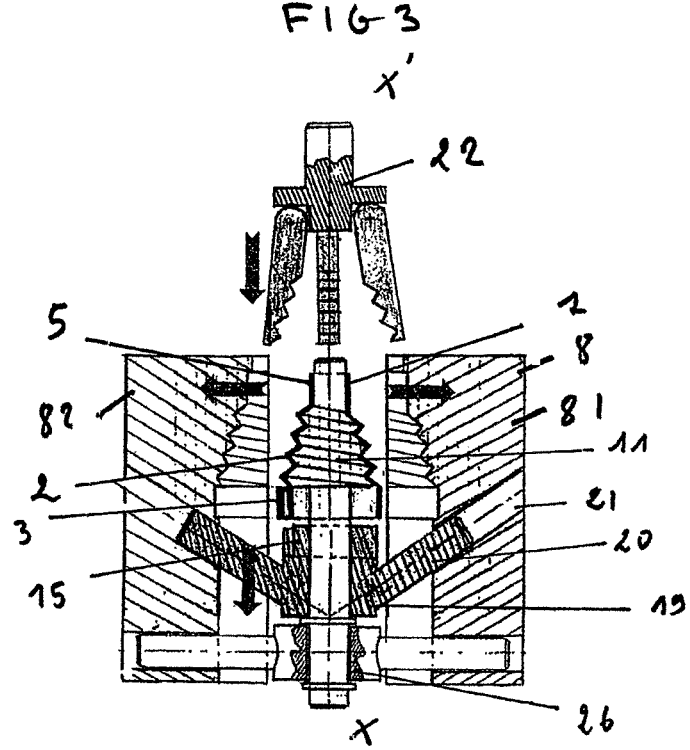
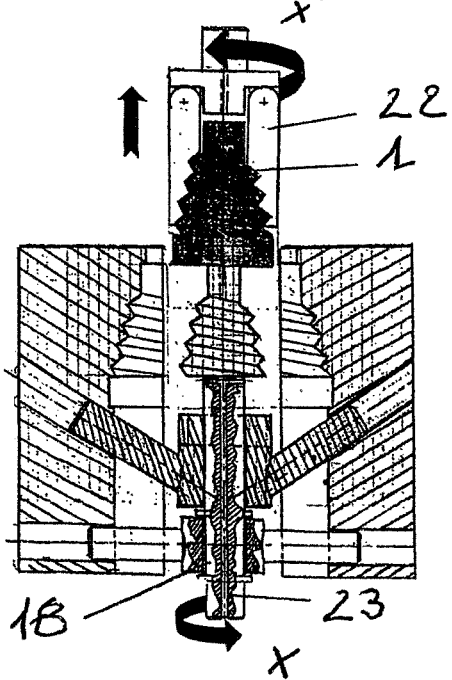

METHOD AND ASSOCIATED TOOLING FOR THE MANUFACTURE OF A SLEEVE BY INJECTION MOULDING, AND RESULTING SLEEVE

RELATED APPLICATION

This application is a National Phase of PCT/FR2017/051611, filed on Jun. 20, 2017, which claims the benefit of priority from French Patent Application No. 16 56184, filed on Jun. 30, 2016, the entirety of which are incorporated by reference.

FIELD OF THE INVENTION

The invention relates to a method and to the associated tooling for manufacturing a sleeve by injection-molding, and to a sleeve resulting therefrom.

The invention relates more particularly to a injection-molding method for manufacturing a sleeve, also referred to as a helical bellows or "boot", comprising a molded hollow body that is cylindrical or cylindroconical, comprising at least one deformable bellows portion arranged in line with a base forming one end of the sleeve, by means of tooling comprising a mold formed of at least two portions defining a mold cavity suitable for passing from an open position to a closed position, and vice versa, by relative movement of said mold portions, and a core that can be inserted at least in part into the mold cavity and comprising a cylindrical or cylindroconical "first" portion that is provided externally with a helical thread that is complementary to a helical thread of the mold so that when the mold cavity is in the closed state, a first mold space is formed between said threads for molding the bellows portion of the sleeve.

PRIOR ART

Persons skilled in the art are well aware of bellows sleeves, in particular transmission or steering bellows, that have radial turns, i.e. sleeves that have a cylindrical or cylindroconical bellows envelope that is defined by a corrugated wall having wave planes that extend in a direction that is substantially radial relative to the longitudinal axis of the envelope.

For a long time, those bellows sleeves were made out of rubber, before being made from thermoplastics material by injection blow molding.

Since that technique does not give complete satisfaction, a method of manufacturing the bellows sleeves by injection-molding in a closed mold has been developed, as shown in patent FR 2 848 497. That method requires the core to be unscrewed relative to the bellows sleeve, which prevents the manufacture of sleeves that are based on complex shapes, in particular multilobed shapes.

Finally, that method generates considerable friction between certain portions of the sleeve and the core, at the risk of damaging said sleeve.

A method for manufacturing a sleeve is also described in application WO 2006/048433.

OBJECTS AND SUMMARY

An object of the invention is therefore to provide a method of the above-mentioned type, which can be used to make a sleeve having a base of complex shape, in particular a multilobed shape.

Another object of the invention is to provide a sleeve with improved strength.

To this end, the invention provides an injection-molding method for manufacturing a sleeve, also referred to as a helical bellows, comprising a cylindrical or cylindroconical molded hollow body comprising at least one deformable bellows portion arranged in line with a base forming one end of the sleeve, by means of tooling comprising a mold formed of at least two portions defining a mold cavity suitable for passing from an open position to a closed position, and vice versa, by relative movement of said mold portions, and also of a core, which core can be inserted at least in part into the mold cavity and comprises a cylindrical or cylindroconical "first" portion that is provided externally with a helical thread that is complementary to a helical thread of the mold, so that when said mold cavity is in the closed state, a first mold space is formed between said helical threads for molding the bellows portion of the sleeve, the method being characterized in that, in addition to the cylindrical or cylindroconical first portion provided externally with a helical thread, the core also comprises a "movable", second portion that is complementary to a recessed portion of the mold so that, when said mold cavity is in the closed state, a second mold space is formed between said second portion of the core and the recessed portion of the mold for molding the base of the sleeve, and when the core is inserted at least in part in the mold cavity and when the mold cavity is in the closed state, said method comprises a step of filling the first and second mold spaces left free between the core and the inside of the mold cavity by injecting material therein, a step of opening the mold during which, or at the end of which, the second portion of the core is moved axially in a direction parallel to the winding axis of the threads of the helical thread of the first portion of the core going away from the first portion of the core, and a step of driving turning movement of the sleeve relative to the first portion of the core with a view to removing the sleeve from the mold by unscrewing.

Designing the core as a plurality of separable portions makes it possible to make a sleeve of complex shape.

In an implementation of the method, said method comprises, before the step of driving turning movement of the sleeve relative to the first portion of the core with a view to removing the sleeve from the mold by unscrewing, a step of injecting a fluid under pressure between the first portion of the core and the sleeve.

The fluid under pressure, such as air, facilitates removing the bellows portion of the sleeve from the mold.

In an implementation of the method, when the core is inserted in the mold cavity, said method comprises a step of closing the mold cavity during which the second portion of the core is moved axially in a direction that is parallel to the winding axis of the helical threads of the first portion of the core, towards the first portion of the core.

Preferably, the movement of the second portion of the core takes place synchronously with the step of closing the mold cavity. This makes it possible to shorten cycle times.

The invention also provides injection-molding tooling for manufacturing a sleeve, also referred to as a helical bellows, comprising a molded hollow cylindrical or cylindroconical body comprising at least one deformable bellows portion arranged in line with a base forming one end of the sleeve, said tooling comprising a mold formed of at least two portions defining a mold cavity suitable for passing from an open position to a closed position, and vice versa, by relative movement of said mold portions, and also of a core, which core can be inserted at least in part into the mold cavity, said sleeve being formed by filling, by means of a filling material, the space left free between the core and the inside of the mold cavity, the tooling being characterized in that the core is in at least two separable portions and comprises a cylindrical or cylindroconical "first" portion that is provided externally with a helical thread that is complementary to a helical thread of the mold so that, when the core is inserted at least in part in the mold cavity and when the mold cavity is in the closed state, a first mold space is formed between said helical threads for molding the bellows portion with helical turns of the sleeve, and a second portion that is complementary to a recessed portion of the mold so that, when the core is inserted at least in part in the mold cavity of the mold, and when the mold cavity is in the closed state, a second mold space is formed between said second portion of the core and the recessed portion of the mold for molding the base of the sleeve, the second portion of the core being a "movable" portion that is movable axially in a direction parallel to the winding axis of the threads of the helical thread of the first portion of the core going away from or towards the first portion of the core, when the core is inserted in the mold cavity. Making the core as a plurality of separable portions makes it possible to limit friction at the base during unscrewing, and makes it possible to make a sleeve having a non-circular base.

In an embodiment of the tooling, said first and second portions of the core, when positioned close to each other, are coupled to each other by assembly by sliding engagement with an engagement direction extending parallel to the winding axis of the threads of the helical thread of the first portion of the core.

In an embodiment of the tooling, the core comprises a shaft section in line with the first portion of the core and at one end of the cylindrical or cylindroconical shape of said first portion of the core, which shaft section has the second portion of the core threaded thereon for assembly by sliding engagement between said first and second portions of the core. Thus, the second portion of the core is held in reliable manner, centered relative to the first portion of the core. This results in manufacturing of the sleeve that is more accurate and secure.

In an embodiment, the mold and the core are configured to enable the second portion of the core to move between a position close to the first portion of the core and a position spaced apart from the first portion of the core at the same time as the portions of the mold move between a closed position and an open position of the mold cavity, the movement of the second portion of the core. This results in reduced cycle time.

In an embodiment, the core comprises a third portion extending in line with the second portion and constrained to move with the second portion, with the second portion extending between the first portion and the third portion of the core, this third portion comprising two arms, or respectively housings, together forming a V-shape that is open in the direction of the first portion of the core, the two arms, or respectively housings, being suitable for cooperating with housings or respectively arms, of shape that is complementary to the portions of the mold in order to cause the second portion of the core to move axially away from the first portion of the core, at the same time as the portions of the mold move apart, corresponding to opening the mold.

In an embodiment, the tooling comprises means for driving turning movement of the first portion of the core relative to the sleeve about an axis parallel to the winding axis of the threads of the helical thread of the first portion of the core. Specifically, even though it is possible to envisage unmolding by unscrewing manually, this unscrewing is preferably automated. The means for driving turning may be configured to drive turning of the sleeve and/or of the first portion of the core.

In an embodiment, the tooling comprises injection means for injecting a fluid under pressure, said injection means being housed at least in part inside said first portion of the core, the first portion of the core being in the form of a hollow body.

These means for injecting fluid, such as air, under pressure separate the walls of the sleeve from the core and limit friction between the sleeve and the core when the sleeve turns relative to the core. The fluid outlet orifices of the injection means are covered by movable portions of the core in the position for injecting material and they are uncovered in the open position of the mold.

In an embodiment, the zone of the second portion of the core of shape that is complementary to the recessed portion of the mold in order to form the second mold space between said second portion of the core and the recessed portion of the mold is a multilobed surface formed of openings that are preferably circularly arcuate and that are connected together by segments of surfaces that are preferably circular. When they are circular, these surfaces are of center radius intersecting the winding axis of the helical threads of the first portion of the core.

In an embodiment, the core comprises a cylindrical body in line with the first portion of the core, at an end of the cylindrical or cylindroconical shape of said first portion of the core that is opposite from the end that can be positioned facing the second portion of the core, which cylindrical body is of a shape that is complementary to a recessed portion of the mold so that, when the core is inserted in the mold cavity of the mold and the mold cavity is in the closed state, a third mold space is formed between said cylindrical body of the core and the recessed portion of the mold for molding an end of the sleeve opposite the base of the sleeve. The cylindrical body may be made as a single part with the first portion of the core, or separately. Preferably, when the cylindrical body is separate, it is centered in the end of the first portion of the core by a cone and it centers the end in the two portions of the closed mold.

In an embodiment, the tooling comprises holding means for holding the core when it is inserted at least in part in the mold cavity. These holding means make it possible for at least certain portions of the core to be held in position in the mold, without impeding turning of the first portion of the core, if necessary.

The invention also provides a core suitable for being inserted at least in part into the mold cavity of a mold formed of at least two portions in order to obtain tooling with a view to manufacturing a sleeve, also referred to as a helical bellows, comprising a cylindrical or cylindroconical molded hollow body comprising a deformable bellows portion arranged in line with a base forming one end of the sleeve, said sleeve being formed by filling, by means of a filling material, the space left free between the core and the inside of the mold cavity, when the core is inserted at least in part in the mold cavity and when the mold cavity is in the closed state, the core being characterized in that it is formed of at least two separable portions and comprises a cylindrical or cylindroconical "first" portion that is provided externally with a helical thread, a second portion, and a shaft section in line with the first portion of the core and at one end of the cylindrical or cylindroconical shape of said first portion of the core, which shaft section is suitable for having the second portion of the core threaded thereon for assembly by sliding engagement between said first and second portions of the core so as to enable axial movement of the second portion of the core in a direction parallel to the winding axis of the threads of the helical thread of the first portion of the core going away from or towards the first portion of the core.

The invention also provides a sleeve, also referred to as a helical bellows, comprising a cylindrical or cylindroconical molded hollow body comprising at least one deformable bellows portion arranged in line with a base forming one end of the sleeve, the sleeve being characterized in that said sleeve is an injection-molded part presenting internally at least one join plane at the junction between the base and the bellows portion.

Optionally, the base may be of inside shape that is multilobed. The bellows portion and the base may be made of different materials, preferably thermoplastics materials.

The sleeve may include lugs or webs for attaching it and preventing it from turning and that are suitable for being used while the sleeve is being manufactured.

BRIEF DESCRIPTION OF THE DRAWINGS

The invention can be better understood on reading the following description of embodiments given with reference to the accompanying drawings, in which:

FIG. 3 is a fragmentary and diagrammatic section view of tooling in accordance with the invention, during opening of the mold cavity in order to show the second portion of the core being moved axially simultaneously.

FIG. 4 is a fragmentary and diagrammatic section view of tooling in accordance with the invention, with the mold cavity in the open position and with the sleeve in the unscrewed state.

DETAILED DESCRIPTION

Figure 5:
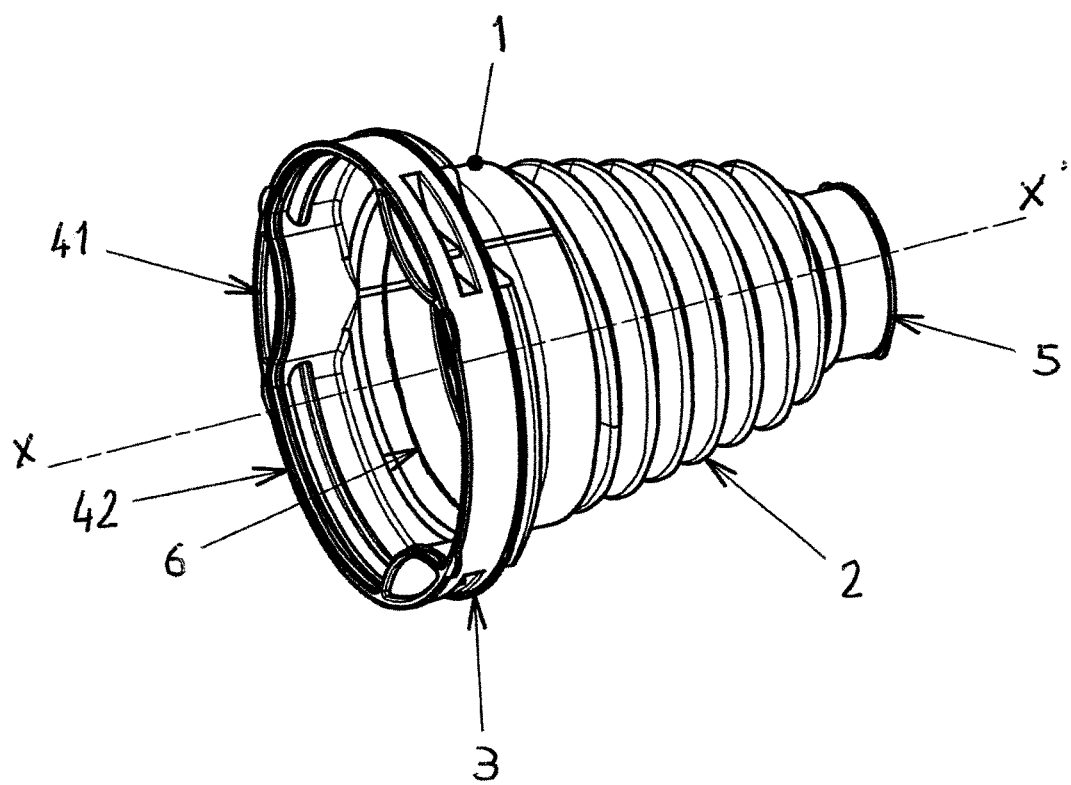
FIG. 5 is a perspective view of a sleeve in accordance with the invention.
Figure 6:
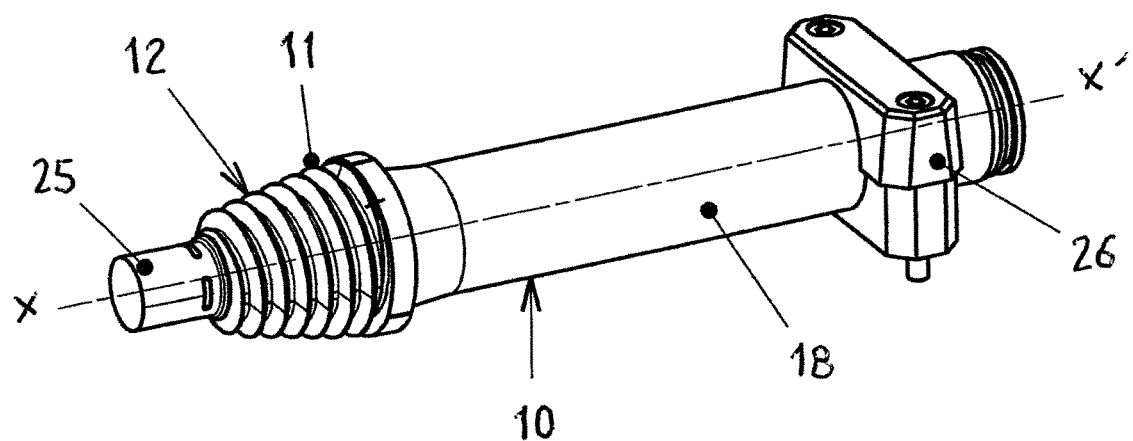
FIG. 6 is a fragmentary view in perspective of the core and of its holding means, the second and third portions of the core being omitted.

As mentioned above, the invention provides a method for manufacturing a sleeve 1, also referred to as a helical bellows, and which may be as shown in FIG. 5.

This sleeve 1 is an injection-molded part that is generally made from thermoplastic material, in particular from polyester, polyamide, or polyurethane. This sleeve 1 comprises a molded hollow body that is cylindroconical in this example. The sleeve 1 comprises a deformable bellows portion 2, arranged in line with a base 3 forming one end of the sleeve 1. The bellows portion 2 presents turns forming a helical winding about the longitudinal axis of the cylindroconical body. In this example, the base 3 is a base of outside shape that is circular and of inside shape that is not circular.

The inside shape of the base 3 is multilobed, specifically trilobed, with the bulges that correspond to the lobes being given the reference 41, and with the circular segments of center radius intersecting the longitudinal axis of the body that connects the bulges together being given the reference 42.

At its end opposite the end provided with the base 3, the sleeve 1 further comprises a generally circular portion referred to as the minor base 5 of the sleeve. Because of the way it is manufactured, the sleeve presents at least one join plane 6 that can be seen inside the junction between the base 3 and the bellows portion 2 of the sleeve 1. The join plane 6 forms a circular inside circumferential line. The join plane is made in an axial surface of the sleeve, i.e. a surface of the sleeve that extends parallel to the longitudinal axis of the sleeve, as opposed to a radial surface. The circular inside circumference line formed by the join plane extends in a plane that is perpendicular to the longitudinal axis of the cylindroconical body.

In order to manufacture a sleeve as shown in FIG. 5, it is possible to use tooling 7 as shown in FIGS. 1 to 4 and 6. In this example, this tooling 7 comprises a mold 8 formed in two portions 81, 82, each forming a shell of the mold 8. These two portions 81, 82 of the mold 8 define a mold cavity 9. These two mold portions 81, 82 are mounted on a stand, movable in sliding to move towards or away from each other, in order for the mold cavity 9 to pass from the open position corresponding to the portions 81, 82 of the mold 8 in the moved apart position to the closed position corresponding to the portions 81, 82 of the mold 8 in the moved together position. The mold 8 is generally made of metal, in a manner that is known for an injection mold.

The tooling 7 further comprises a core 10 that can be inserted at least in part into the mold cavity 9. The core 10 includes a first portion 11, in this example a cylindroconical portion, that is provided externally with a helical thread 12 that is complementary to a helical thread 13 of the mold 8 so that, when the core 10 is inserted at least in part in the mold cavity 9 and when the mold cavity 9 is in the closed state, a first mold space 14 is formed between said helical threads 12, 13 for molding the bellows portion 2 with helical turns of the sleeve 1.

The core 10 includes a second portion 15 that is complementary to a recessed portion 16 of the mold 8, such that when the core 10 is inserted in the mold cavity 9 and when the mold cavity 9 is in the closed state, a second mold space is formed between the second portion 15 of the core 10 and the recessed portion 16 of the mold 8 for molding the base 3 of the sleeve 1.

This second portion 15 of the core 10 is a "movable" portion that is movable axially in a direction parallel to the winding axis XX' of the threads of the helical thread 12 of the first portion 11 of the core 10 so as to move away from or towards the first portion 11 of the core 10 when the core 10 is inserted at least in part in the mold cavity 9.

The zone of the second portion 15 of the core 10 of shape that is complementary to the recessed portion 16 of the mold 8 in order to form the second mold space 17 between said second portion 15 of the core 10 and the recessed portion 16 of the mold 8 is a multilobed surface 24 formed of circularly arcuate openings 241 that are connected together by segments 242 of circular surfaces of center radius intersecting the winding axis XX' of the threads of the helical thread of the first portion 11 of the core 10.

Locally, this second portion 15 of the core has an outside surface that is cylindrical or slightly conical that makes it possible for the second portion of the core to be centered correctly in the two half-shells 81 and 82 of the mold when the mold is closed. Thus, the entire core is properly centered inside the mold and guarantees good repeatability for the portions of the sleeve that are of small thickness.

In order to enable the second portion 15 of the core 10 to move axially, the core 10 comprises a shaft section 18, in line with the first portion 11 of the core 10 and at one end of the cylindrical or cylindroconical shape of said first portion 11 of the core 10, which shaft section 18 has the second portion 15 of the core 10 threaded thereon for assembly by sliding engagement between said first and second portions 11, 15 of the core 10. This second portion 15 of the core 10 therefore has a generally annular shape with a circular inside surface and an outside surface as described above. The second portion 15 of the core is shaped externally in order to form centering means on a portion of its surface, for centering said second portion on the inside of the mold in the closed position of the mold.

The shaft section 18 is constrained to move with the first portion 11 of the core 10. Preferably, the shaft section 18 and the first portion 11 of the core are made as a single part.

The shaft section 18 extends on the same axis as the winding axis XX' of the threads of the helical threads 12 of the first portion 11 of the core 10. This shaft section 8 is pre-positioned inside the mold cavity 9, by means of holding means 26, which in this example are formed by a ring forming a bearing with the free end of the shaft section 18 being inserted therein, the ring being suitable for being arranged inside or outside the space made between the portions 81, 82 of the mold 8.

In the example shown, the mold 8 and the core 10 are configured to enable the second portion 15 of the core 10 to move between a position close to the first portion 11 of the core 10 and a position spaced apart from the first portion 11 of the core 10, at the same time as the portions 81, 82 of the mold 8 move between a closed position and an open position.

In this embodiment, the core 10 comprises a third portion 19 extending in line with the second portion 15 and constrained to move with the second portion 15, with the second portion 15 extending between the first portion 11 and the third portion 19 of the core 10.

This third portion 19 includes a ring sliding on the shaft section 8, the ring comprising two arms 20 together forming a V-shape that is open in the direction of the first portion 11 of the core 10. The two arms 20 are suitable for being inserted into housings 21 of shape that is complementary to the portions 81, 82 of the mold 8 and they cooperate with said housings 21 in order to enable the second portion 15 of the core 10 to move axially away from the first portion 11 of the core 10 at the same time as the portions 81, 82 of the mold 8 move apart corresponding to opening the mold 8.

Figure 7:
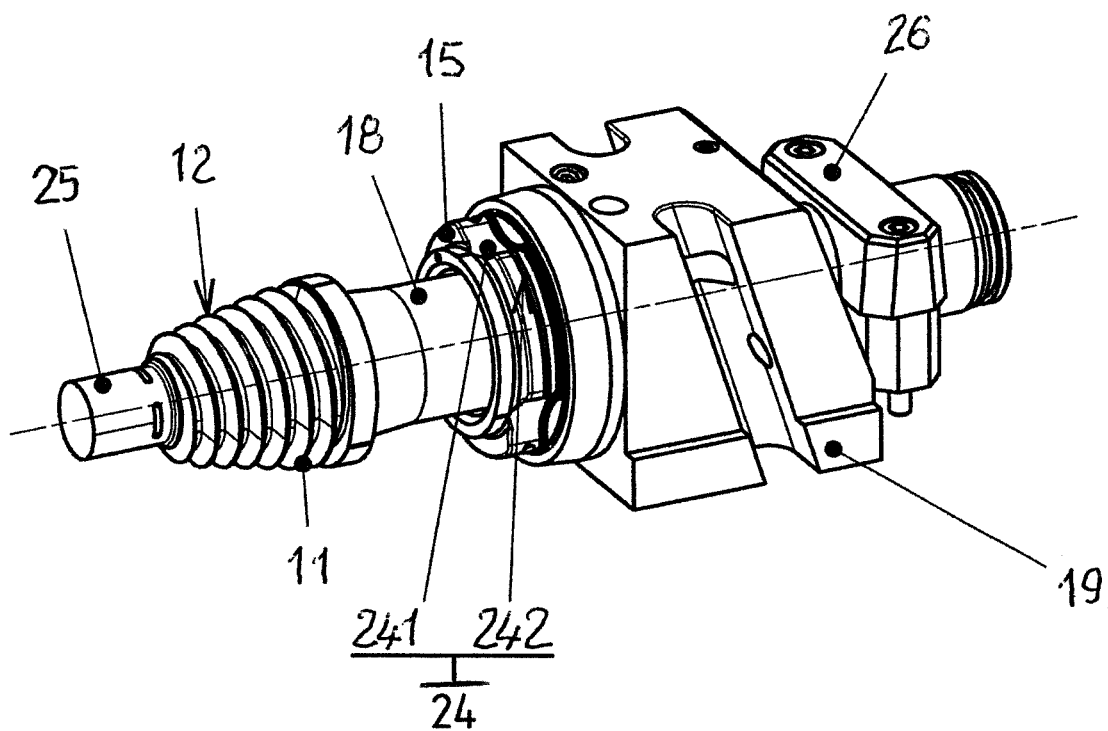
FIG. 7 is a perspective view of the core and of its holding means, in a position spaced apart from the first and second portions of the core.
Figure 8:
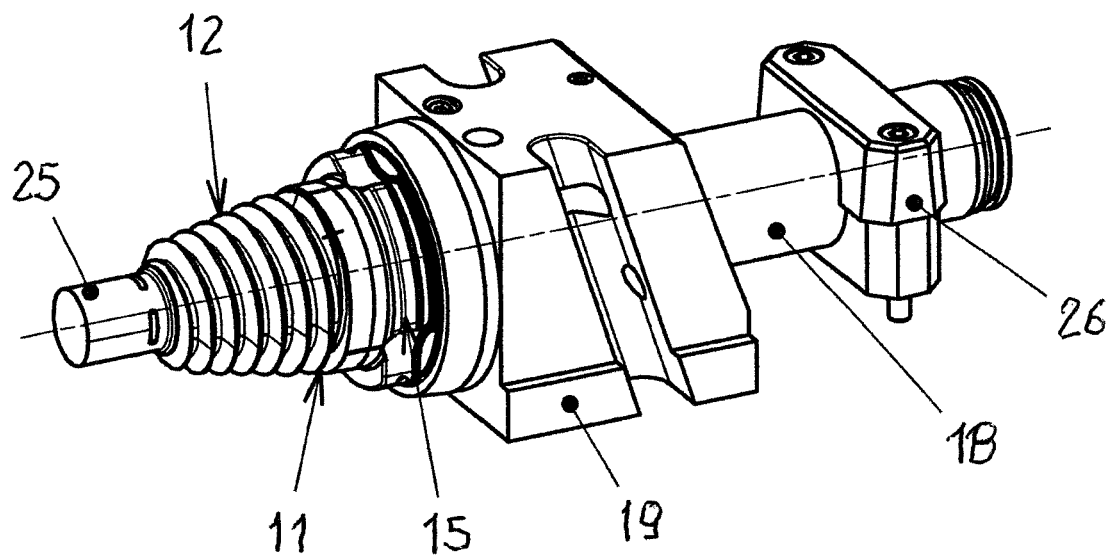
FIG. 8 is a perspective view of the core and of its holding means, in a position close to the first and second portions of the core.

In a variant, the opposite may apply, namely, the arms may be carried by the mold and the housings may be carried by the core as shown in FIG. 7, where housings are shown in the core.

Thus, in this embodiment, when the portions 81, 82 of the mold 8 are driven to move apart, as shown in FIG. 3, the arms 20 tend, under the action of going away from each other, to slide out of the housings 21 of the mold portions by going away from the portion 11 of the core 10.

Figure 2:
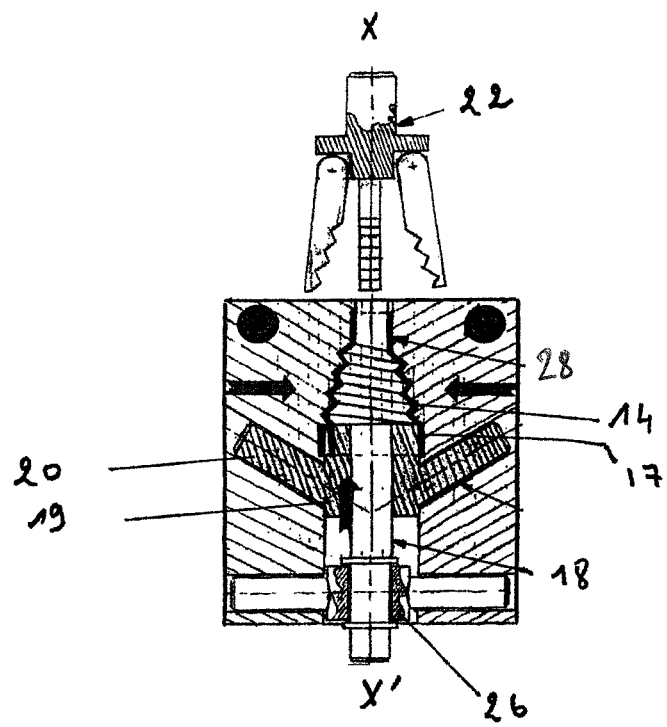
FIG. 2 is a fragmentary and diagrammatic section view of tooling in accordance with the invention, with the mold cavity in the closed position and after injection of the mold filling material.

Conversely, when the portions 81, 82 of the mold 8 are moved towards each other, as shown in FIG. 2, the arms 20 tend, under the action of moving towards each other, to slide into the housings 21 of the mold portions, by moving towards the first portion 11 of the core 10.

Thus, the second portion 15 of the core 10 tends to move towards the first portion of the core during closing of the mold cavity and to move away from the first portion of the core during opening of the mold cavity.

The means for driving movement of the portions 81, 82 of the mold towards or away from each other are conventional means for this type of mold, and, by way of example, they are formed by actuators associated with means for guiding the mold portions. They are therefore not described in detail, since they are well known to those skilled in the art.

The core 10 comprises a cylindrical body 25 in line with the first portion 11 of the core 10, at an end of the cylindroconical shape of said first portion 11 of the core 10 that is opposite from the end that can be positioned facing the second portion 15 of the core 10, which cylindrical body 25 is of shape that is complementary to a recessed portion 27 of the mold 8 so that, when the core 10 is inserted in the mold cavity 9 of the mold 8 and the mold cavity 9 is in the closed state, a third mold space 28 is formed between said cylindrical body 25 of the core 10 and the recessed portion 27 of the mold 8 for molding an end of the sleeve 1 opposite from the base 3 of the sleeve 1 and referred to as the minor base 5 of the sleeve.

In the example shown, the cylindrical body 25 and the first portion 11 of the core 10 are made as a single part. In manner equivalent to the second portion 15 of the core 10, the cylindrical body 25 could be made separately from the first portion of the core 10, and then either threaded on a shaft section extending in line with the first portion of the core, for assembly by sliding engagement between said cylindrical body 25 and the first portion 11 of the core 10, or else threaded on a stationary bearing of the tooling. The sleeve could then be provided internally, at the junction zone between the minor base 5 and the bellows portion 2 of the sleeve 1, with an additional join plane.

To complete the assembly, the tooling further comprises means 23 for injecting a fluid under pressure, said injection means 23 being housed at least in part inside the first portion 11 of the core 10, the first portion 11 of the core 10 being in the form of a hollow body.

Thus, these means 23 for injecting a fluid under pressure, specifically air, may comprise a duct connected at one end to a feed source of air under pressure, and opening out to its other end at the interface of each junction of the movable portions of the core shown in FIG. 4. While material is being injected, the positions of the orifices opening out into the junction surfaces serve to avoid filling the orifices, since the movable portions of the core block these outlet orifices during injection of the material and uncover them when the movable portions of the core move away.

Finally, the tooling comprises means 22 for driving turning movement of the first portion 11 of the core 10 relative to the sleeve 1 about an axis parallel to the winding axis XX' of the threads of the helical thread 12 of the first portion 11 of the core 10. In the example shown in FIG. 4, these means 22 are means for driving turning of the sleeve 1 and they are in the form of a clamp suitable for gripping said sleeve and for turning it about the axis XX'. Means for driving turning of the core could have been provided in additional or alternative manner.

In the example shown in FIG. 4, the shaft section 18, constrained to move with the first portion 11 of the core 10, is shown to be rotary and it is mounted to turn about the winding axis XX' of the threads of the helical thread 12 of the first portion of the core 10.

The means 22 for driving turning are thus means for driving turning of the shaft section 18, turning being performed by meshing, by endless transmission, or by other means.

Figure 1:
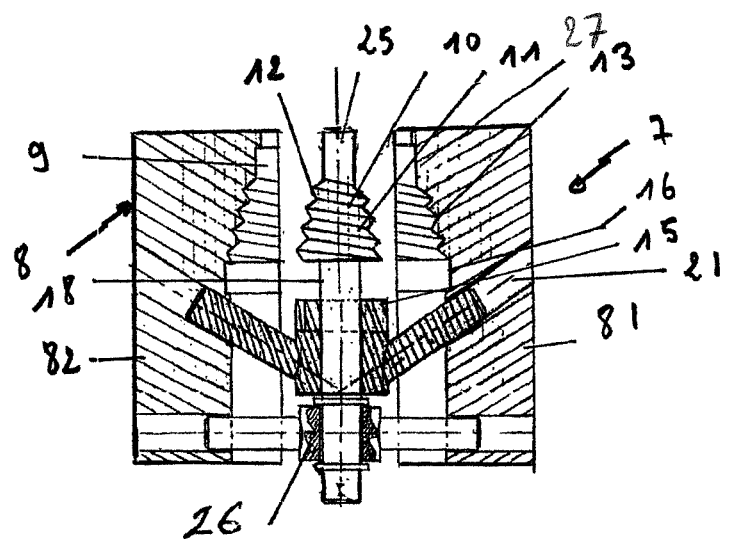
FIG. 1 is a fragmentary and diagrammatic section view of tooling in accordance with the invention, with the mold cavity in the open position before injection.

By means of tooling 7 as described above, a sleeve is manufactured as follows: the mold 8 is in the open position and the core 10 is housed and held inside the mold cavity 9, as shown in FIG. 1, i.e. with the second portion of the core spaced apart from the first portion of the core.

Initially, the portions 81, 82 of the mold are moved towards each other, to enable the mold cavity 9 to pass into the closed position. The portions 81, 82 of the mold 8 being moved towards each other leads to the second portion 15 of the core 10 and the first portion 11 of the core being moved simultaneously towards each other, by co-operation between the arms 20 and the housings 21.

With the mold cavity 9 in this closed position, the material for filling the first, second, and third mold spaces is injected. This filling material therefore fills the space left free between the inside of the mold cavity and the core, as shown in FIG. 2.

Once injection has finished, the mold is opened. During this opening of the mold, the second portion 15 of the core 10 moves away from the first portion 11 of the core 10. Air is injected between the inside wall of the sleeve and the outside wall of the first portion 11 of the core 10 in order to separate the wall of the sleeve from the core 10. The clamp again grips the sleeve, in order to turn it in the direction for unscrewing the first portion 11 of the core 10. In a variant or in addition, the first portion 11 of the core 10 may be driven in turning.

In addition, in the example shown, the second portion of the core is moved axially away from the first portion of the core of the first portion of the core 10 at the same time as the mold is opened. This axial movement could be triggered after the mold has been opened, without going beyond the ambit of the invention, even though the simultaneous opening solution is preferred.

The sleeve obtained provides excellent strength.

The invention claimed is:

1. An injection-molding method for manufacturing a sleeve in the shape of a cylindrical or cylindroconical molded hollow body with at least one deformable bellows portion arranged in line with a base, the base forming one end of the sleeve, said method comprising the steps of:

Obtaining a mold formed of at least two portions defining a mold cavity therebetween, said at least two portions movable between an open position and a closed position by relative movement of said mold portions, Obtaining a core, that is insertable at least in part into the mold cavity, said core having a cylindrical or cylindroconical first portion that has an external helical thread that is complementary to helical threads in the mold cavity, so that, when said mold cavity is in the closed position, a first mold space is formed between said external helical threads of said core and said helical threads in said mold cavity for molding said at least one deformable bellows portion of the sleeve, said core also having a second movable portion that is complementary to a recessed portion of the mold so that, when said mold cavity is in the closed state, a second mold space is formed between said second movable portion of the core and the recessed portion of the mold for molding the base of the sleeve, filling the first and second mold spaces left free between the core and the inside of the mold cavity by injecting material therein, when the core is inserted at least in part in the mold cavity and when the mold cavity is in the closed state, opening the mold, and either during or after the opening, the second movable portion of the core is moved axially, in a direction parallel to a winding axis of the threads of the helical thread of the first portion of the core going away from the first portion of the core, and driving turning movement of the sleeve relative to the first portion of the core to remove the sleeve from the mold by unscrewing.

2. A method of manufacturing by injection a sleeve according to claim 1, further comprising the step of, before the step of driving turning movement of the sleeve relative to the first portion of the core, a step of injecting a fluid under pressure between the first portion of the core and the sleeve.

\* \* \* \* \*